US012559123B2

(12) United States Patent
Sakata

(10) Patent No.: US 12,559,123 B2
(45) Date of Patent: Feb. 24, 2026

(54) DRIVING ASSISTANCE SYSTEM, DRIVING ASSISTANCE METHOD, AND RECORDING MEDIUM

(71) Applicant: Panasonic Automotive Systems Co., Ltd., Kanagawa (JP)

(72) Inventor: Takanori Sakata, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 97 days.

(21) Appl. No.: 18/612,400

(22) Filed: Mar. 21, 2024

(65) Prior Publication Data

US 2024/0326856 A1    Oct. 3, 2024

(30) Foreign Application Priority Data

Mar. 28, 2023    (JP) ................................. 2023-052143

(51) Int. Cl.
| | |
|---|---|
| B60W 50/14 | (2020.01) |
| B60R 1/12 | (2006.01) |
| G08G 1/16 | (2006.01) |
| B60R 1/00 | (2022.01) |

(52) U.S. Cl.
CPC ............... B60W 50/14 (2013.01); B60R 1/12 (2013.01); G08G 1/167 (2013.01); B60R 1/00 (2013.01); B60R 2001/1215 (2013.01); B60R 2300/303 (2013.01); B60R 2300/607 (2013.01); B60R 2300/70 (2013.01); B60R 2300/8093 (2013.01); B60W 2050/146 (2013.01); B60W 2520/10 (2013.01)

(58) Field of Classification Search
CPC .......... G08G 1/16; G08G 1/167; G08G 1/168; B60K 35/00; B60R 1/00; B60R 1/12;

B60R 1/27; B60R 1/31; B60R 11/00; B60R 11/04; B60W 30/06; B60W 50/14; G06V 20/56
See application file for complete search history.

(56) References Cited

U.S. PATENT DOCUMENTS

| | | | | |
|---|---|---|---|---|
| 2009/0243824 | A1* | 10/2009 | Peterson ............. | G06F 3/04886 |
| | | | | 348/148 |
| 2011/0234802 | A1* | 9/2011 | Yamada ................. | G02B 27/01 |
| | | | | 348/148 |
| 2020/0285865 | A1* | 9/2020 | Sato ........................ | B60K 35/29 |
| 2024/0071231 | A1* | 2/2024 | Nohara ................... | B60Q 3/217 |

FOREIGN PATENT DOCUMENTS

JP            58-022744            2/1983

* cited by examiner

*Primary Examiner* — Van T Trieu
(74) *Attorney, Agent, or Firm* — Greenblum & Bernstein, P.L.C.

(57)            ABSTRACT

A driving assistance system provides driving assistance to a driver in a vehicle which includes a display disposed in front of a driver seat and an electronic side mirror, and includes: a display condition determiner that determines whether a predetermined condition is satisfied in the vehicle driven by the driver; an image processor that generates an overhead image including an area around the vehicle when the predetermined condition is satisfied; a first control device that displays, on the electronic side mirror, a first image including the overhead image generated by the image processor; and a second control device that displays, on the display, a second image including the overhead image generated by the image processor.

16 Claims, 9 Drawing Sheets

Image diagram when vehicle turns left (forward)

(b) Image diagram when vehicle turns left (electronic side mirror (left))

(c) Image diagram when vehicle turns left (electronic side mirror (right))

Figure 1:
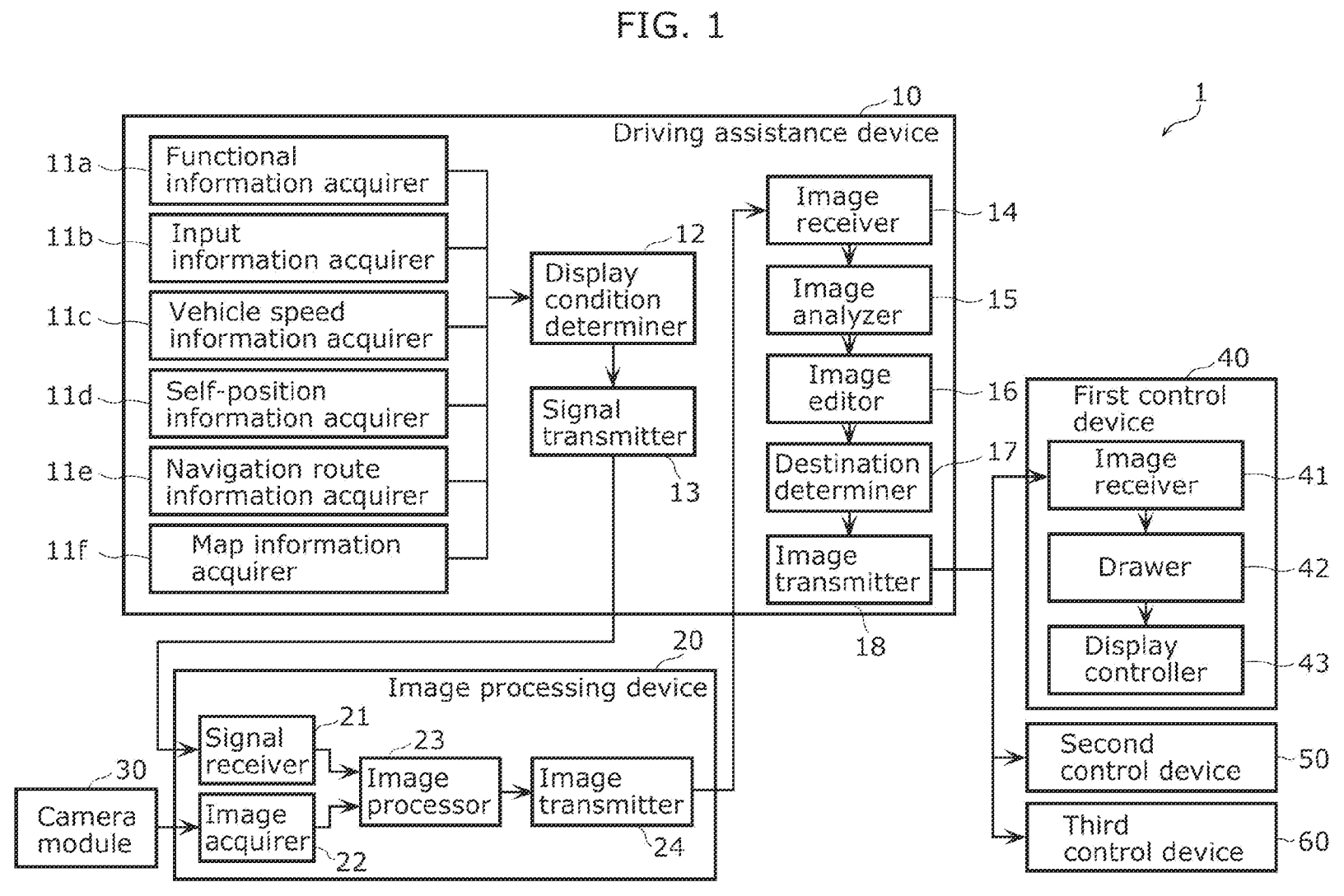

Driving assistance device — 10

Functional information acquirer — 11a
Input information acquirer — 11b
Vehicle speed information acquirer — 11c
Self-position information acquirer — 11d
Navigation route information acquirer — 11e
Map information acquirer — 11f Display condition determiner — 12
Signal transmitter — 13

Image receiver — 14
Image analyzer — 15
Image editor — 16
Destination determiner — 17
Image transmitter — 18

First control device — 40
Image receiver — 41
Drawer — 42
Display controller — 43

Second control device — 50
Third control device — 60

Image processing device — 20
Signal receiver — 21
Image acquirer — 22
Image processor — 23
Image transmitter — 24

Camera module — 30

Figure 2:
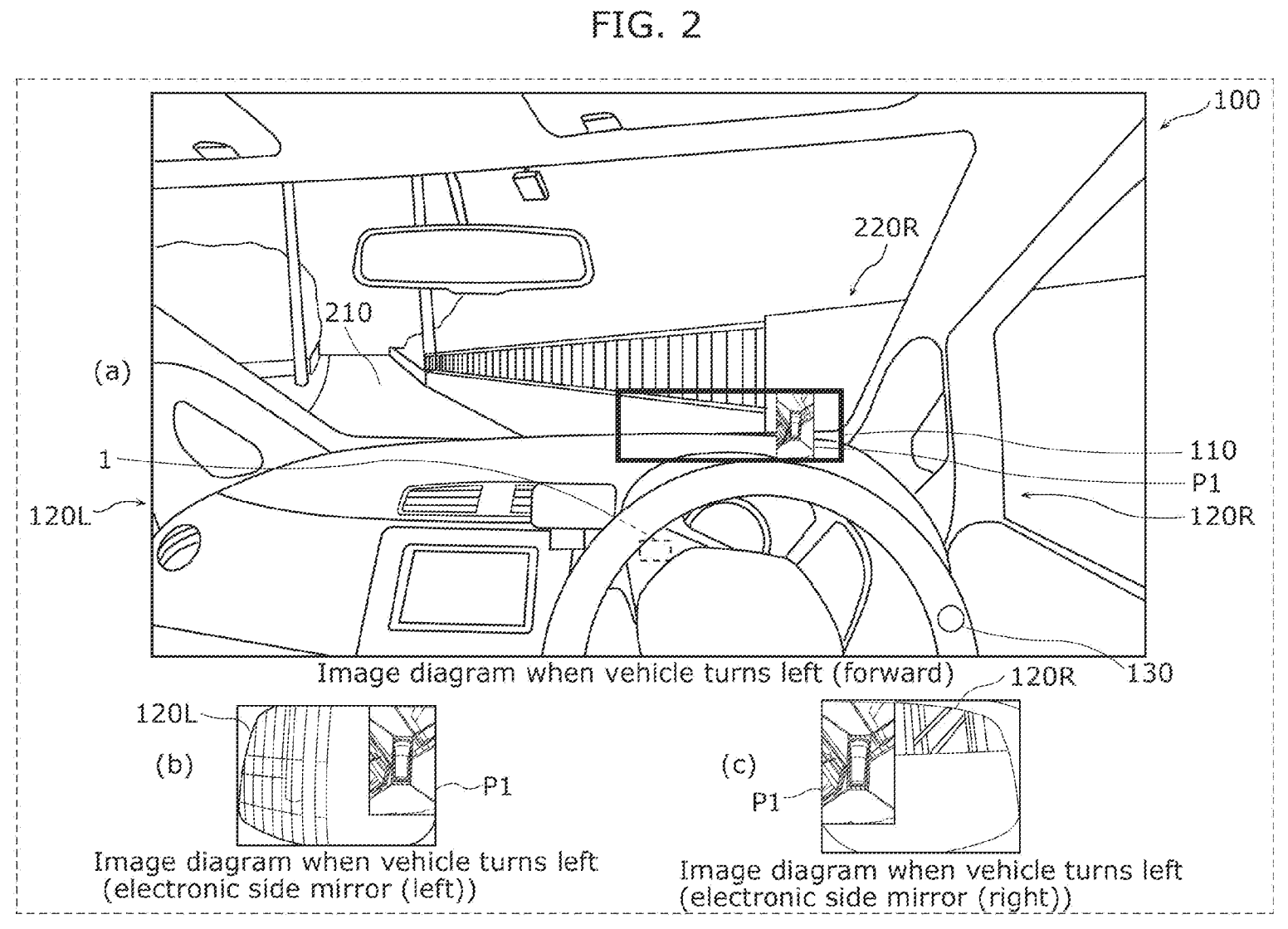

Image diagram when vehicle turns left (forward)

(b)
Image diagram when vehicle turns left
(electronic side mirror (left))

(c)
Image diagram when vehicle turns left
(electronic side mirror (right))

FIG. 3

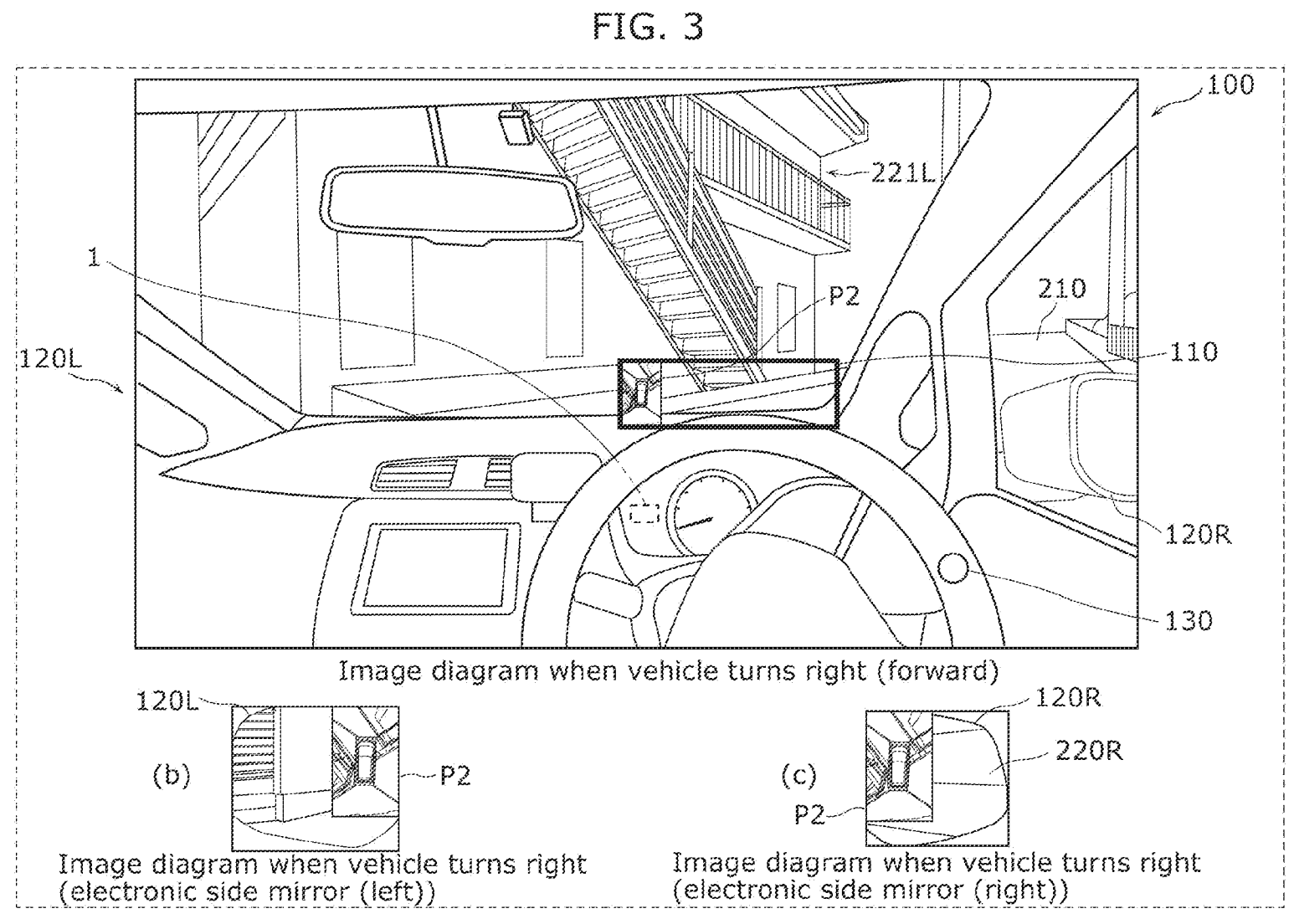

Image diagram when vehicle turns right (forward)

(b) Image diagram when vehicle turns right (electronic side mirror (left))

(c) Image diagram when vehicle turns right (electronic side mirror (right))

Figure 7:
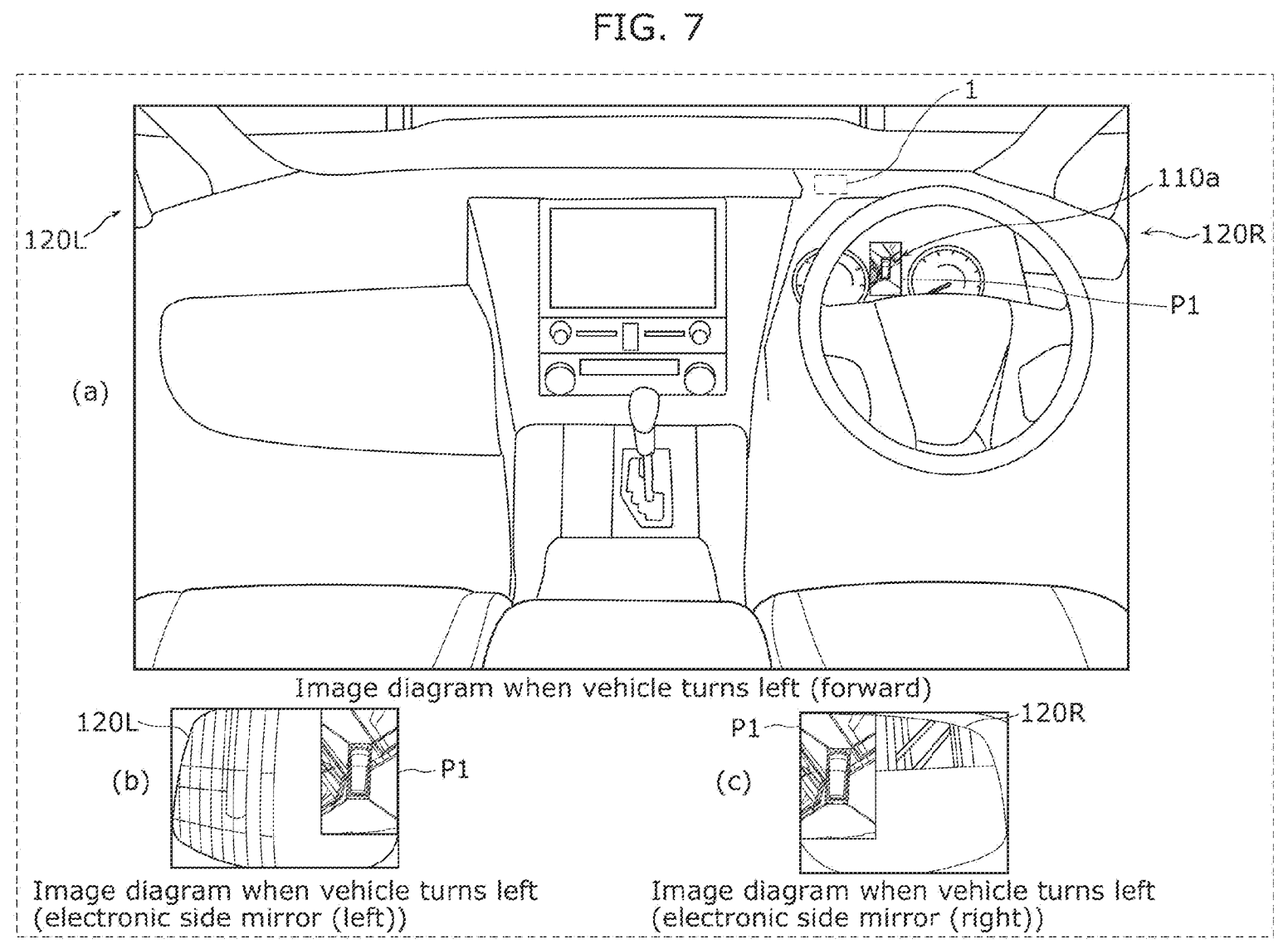

Image diagram when vehicle turns left
(electronic side mirror (left))

(c)

120R

P1

Image diagram when vehicle turns left (forward)

Image diagram when vehicle turns left
(electronic side mirror (right))

(a)

(b) Image diagram when vehicle turns left (electronic side mirror (left))

(c) Image diagram when vehicle turns left (electronic side mirror (right))

Image diagram when vehicle turns left (forward)

Figure 9:
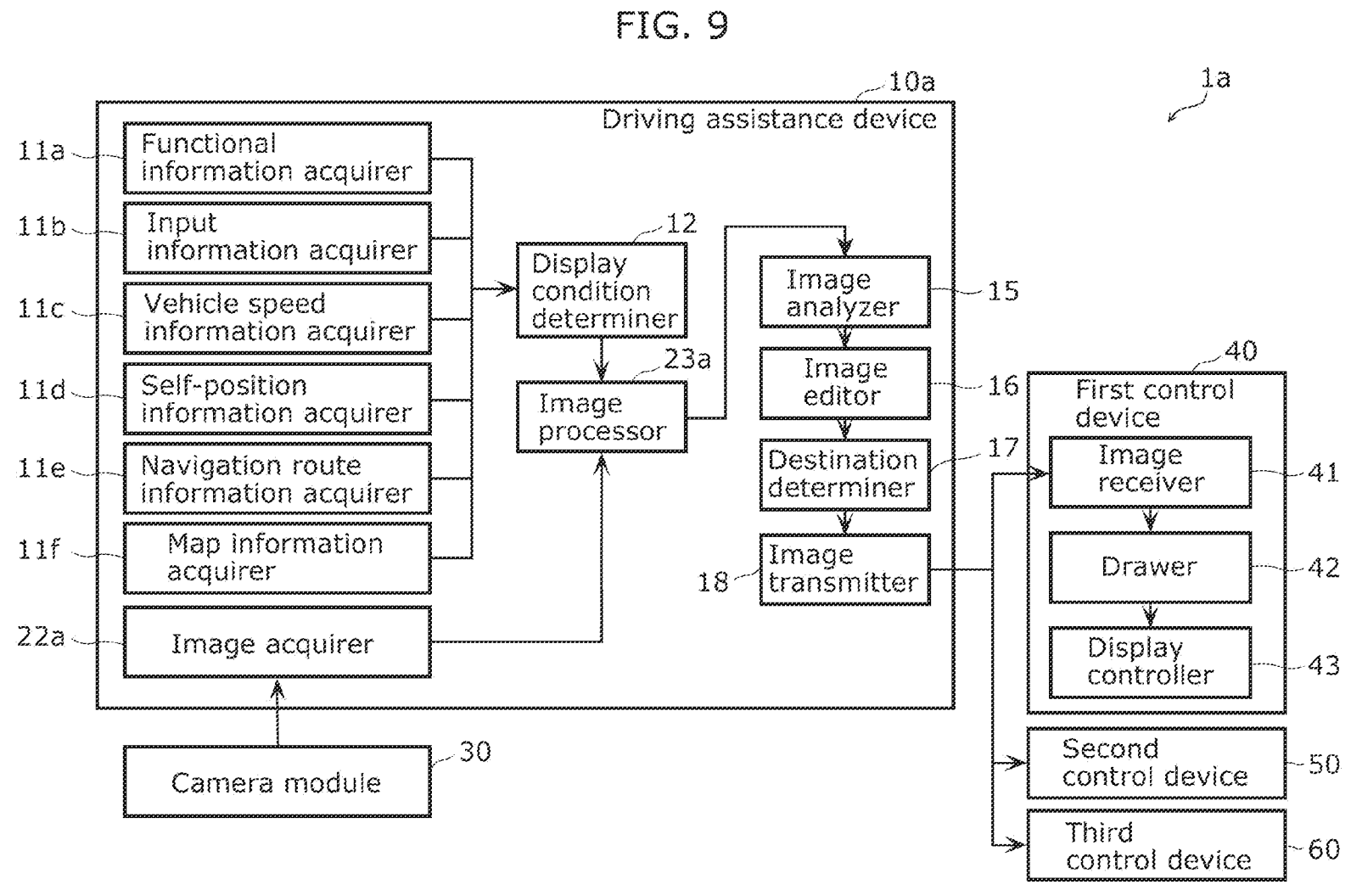

Driving assistance device — 10a

- Functional information acquirer — 11a
- Input information acquirer — 11b
- Vehicle speed information acquirer — 11c
- Self-position information acquirer — 11d
- Navigation route information acquirer — 11e
- Map information acquirer — 11f
- Image acquirer — 22a Camera module — 30

Display condition determiner — 12

Image processor — 23a

Image analyzer — 15

Image editor — 16

Destination determiner — 17

Image transmitter — 18

First control device — 40

- Image receiver — 41
- Drawer — 42
- Display controller — 43

Second control device — 50

Third control device — 60

DRIVING ASSISTANCE SYSTEM, DRIVING ASSISTANCE METHOD, AND RECORDING MEDIUM

CROSS REFERENCE TO RELATED APPLICATION

The present application is based on and claims priority of Japanese Patent Application No. 2023-052143 filed on Mar. 28, 2023.

FIELD

The present disclosure relates to a driving assistance system, a driving assistance method, and a recording medium.

BACKGROUND

Conventionally, various techniques have been studied to assist a driver in a vehicle. For example, Patent Literature (PTL) 1 discloses a technique for monitoring an area around a vehicle and notifying a driver when an obstacle is detected.

CITATION LIST

Patent Literature

PTL 1: Japanese Unexamined Patent Application Publication No. 58-022744

SUMMARY

However, the technique in PTL 1 can be improved upon. In view of this, the present disclosure provides a driving assistance system, a driving assistance method, and a recording medium capable of improving upon the above related art.

A driving assistance system according to an aspect of the present disclosure is a driving assistance system that provides driving assistance to a driver in a vehicle which includes a first display device disposed in front of a driver seat and an electronic side mirror, and the driving assistance system includes: a determiner that determines whether a predetermined condition is satisfied in the vehicle driven by the driver; a generator that generates an overhead image including an area around the vehicle when the predetermined condition is satisfied; a first controller that displays, on the electronic side mirror, a first image including the overhead image generated by the generator; and a second controller that displays, on the first display device, a second image including the overhead image generated by the generator.

A driving assistance method according to an aspect of the present disclosure is a driving assistance method for providing driving assistance to a driver in a vehicle that includes a display device disposed in front of a driver seat and an electronic side mirror, and the driving assistance method includes: determining whether a predetermined condition is satisfied in the vehicle driven by the driver; generating an overhead image including an area around the vehicle when the predetermined condition is satisfied; displaying, on the electronic side mirror, a first image including the overhead image generated; and displaying, on the display device, a second image including the overhead image generated.

A recording medium according to an aspect of the present disclosure is a non-transitory computer-readable recording medium having recorded thereon a program for causing a computer to execute the driving assistance method described above.

According to the aspect of the present disclosure, it is possible to provide the driving assistance system and the like capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a block diagram showing the functional configuration of a driving assistance system according to an embodiment.

FIG. 2 is a diagram for illustrating details of driving assistance provided by the driving assistance system according to the embodiment when a vehicle turns left.

FIG. 3 is a diagram for illustrating details of driving assistance provided by the driving assistance system according to the embodiment when the vehicle turns right.

FIG. 6 is a flowchart showing an operation of a driving assistance device according to the embodiment.

FIG. 7 is a diagram showing an example of an internal configuration of a vehicle according to Variation 1 of the embodiment.

FIG. 9 is a block diagram showing the functional configuration of a driving assistance system according to Variation 2 of the embodiment.

DESCRIPTION OF EMBODIMENTS

Circumstances Leading to the Present Disclosure

Figure 4:
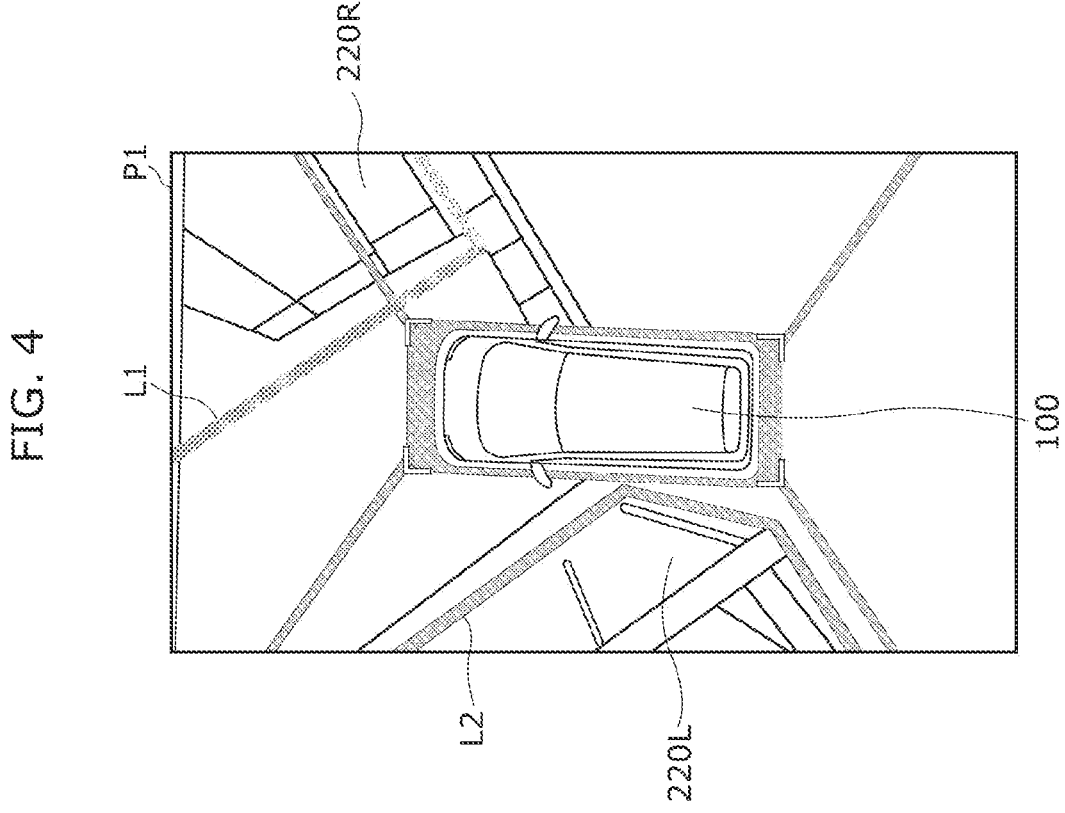
FIG. 4 is a diagram showing an overhead image of the vehicle when the vehicle turns left.

Before description of the present disclosure, circumstances leading to the present disclosure will be described.

When a vehicle travels straight on a narrow road or turns right or left to enter a narrow road, it is necessary to pay attention to the front and the side of the vehicle and to check a distance from an obstacle which may cause a collision, a ditch which may cause a wheel of the vehicle to go off the road or the like while the vehicle is traveling forward. Here, the following two issues exist.

The first issue is that when attention is focused on either the front or the side of the vehicle, the other is neglected, and this may cause a collision or cause the wheel of the vehicle to go off the road. The first issue is of particular concern, for example, when the driver is a novice driver.

The second issue is that there is an increased risk of causing a collision or causing the wheel of the vehicle to go off the road due to the inability to perceive a distance between a vehicle body and the obstacle or the ditch. The second issue is of particular concern, for example, when the driver drives an unfamiliar vehicle such as a car rented from a car sharing service or a rental car service.

For example, when a vehicle turns right or left to enter a narrow road, it is desirable for a driver to be able to easily recognize distances to various small and large obstacles around the vehicle and a ditch while maintaining attention to both the front and the side of the vehicle, and thus a device or the like which can provide driving assistance therefor is required. However, in the technique of PTL 1, it is difficult to detect a low obstacle and a low ditch, and thus it is difficult to say that it is possible to provide sufficient driving assistance.

Therefore, the inventor of the present application has conducted thorough study on a driving assistance system and the like which can assist a driver more than the conventional driving assistance system, and has devised a driving assistance system and the like which will be described below. Since the technique of PTL 1 uses a clearance sonar, it is difficult to detect specific obstacles, and thus there is room for improvement in assisting the driver.

A driving assistance system according to a first aspect of the present disclosure is a driving assistance system that provides driving assistance to a driver in a vehicle which includes a first display device disposed in front of a driver seat and an electronic side mirror, and the driving assistance system includes: a determiner that determines whether a predetermined condition is satisfied in the vehicle driven by the driver; a generator that generates an overhead image including an area around the vehicle when the predetermined condition is satisfied; a first controller that displays, on the electronic side mirror, a first image including the overhead image generated by the generator; and a second controller that displays, on the first display device, a second image including the overhead image generated by the generator.

In this way, it is possible to display the overhead image in sight of the driver both when the driver of the vehicle gazes ahead and when the driver gazes at the electronic side mirror to watch for an obstacle on the side. Hence, the driver can easily recognize the surrounding conditions of the vehicle such as distances to an obstacle and a ditch while appropriately paying attention to the front and the side of the vehicle, with the result that it is possible to realize the driving assistance system which can assist the driver more than the conventional driving assistance system.

For example, a driving assistance system according to a second aspect of the present disclosure is the driving assistance system according to the first aspect in which when the vehicle turns right or left to enter a road narrower than a predetermined value, the second controller may change a display position of the overhead image displayed on the first display device according to whether the vehicle turns right or left.

In this way, the overhead image is displayed in the display position corresponding to whether the vehicle turns right or left to enter the narrow road, and thus it is possible to realize driving assistance suitable for turning right or left to enter the narrow road.

For example, a driving assistance system according to a third aspect of the present disclosure is the driving assistance system according to the first or second aspect in which when the vehicle turns right, the second controller may display the overhead image in a region on a left side of the first display device, and when the vehicle turns left, the second controller may display the overhead image in a region on a right side of the first display device.

In this way, it is possible to more reliably display the overhead image in sight of the driver who gazes ahead both when the vehicle turns right and when the vehicle turns left.

For example, a driving assistance system according to a fourth aspect of the present disclosure is the driving assistance system according to any one of the first to third aspects in which the second image may include a third image and the overhead image displayed on the first display device.

In this way, it is possible to assist the driver in driving the vehicle while suppressing the occurrence of a failure in which the third image is not presented to the driver.

For example, a driving assistance system according to a fifth aspect of the present disclosure is the driving assistance system according to any one of the first to third aspects in which the second image may include only the overhead image.

In this way, it is possible to effectively cause the driver to visually recognize the overhead image.

For example, a driving assistance system according to a sixth aspect of the present disclosure is the driving assistance system according to any one of the first to fifth aspects in which the first controller may display the overhead image in a display region of the electronic side mirror, on a side of the display region that is closer to a vehicle body.

In this way, it is possible to assist the driver in driving the vehicle while suppressing the occurrence of a failure in which the overhead image prevents the driver from checking a rear view using the electronic side mirror.

For example, a driving assistance system according to a seventh aspect of the present disclosure is the driving assistance system according to any one of the first to sixth aspects in which the generator may generate the overhead image in which an obstacle around the vehicle or an area that may cause a wheel of the vehicle to go off a road is highlighted.

In this way, the driver easily recognizes the danger of colliding with the obstacle or causing the wheel of the vehicle to go off the road, and thus it is possible to effectively assist the driver in driving the vehicle.

For example, a driving assistance system according to an eighth aspect of the present disclosure is the driving assistance system according to any one of the first to seventh aspects in which the predetermined condition may include a first condition in which a speed of the vehicle is less than or equal to a predetermined speed, and a turn signal lever included in the vehicle is being operated, and when the first condition is satisfied, the determiner may determine that the predetermined condition is satisfied.

In this way, when the driver is predicted to turn right or left such as when the speed of the vehicle is low and the turn signal lever is being operated, it is possible to effectively assist the driver in turning right or left.

For example, a driving assistance system according to a ninth aspect of the present disclosure is the driving assistance system according to any one of the first to eighth aspects in which the predetermined condition may include a second condition in which when the vehicle turns right or left to enter a road narrower than a predetermined value according to an instruction from a navigation system of the vehicle, a speed of the vehicle is less than or equal to a predetermined speed in an area where the vehicle turns right or left, and when the second condition is satisfied, the determiner may determine that the predetermined condition is satisfied.

In this way, when the vehicle turns right or left to enter the road narrower than the predetermined value, it is possible to effectively assist the driver in turning right or left.

For example, a driving assistance system according to a tenth aspect of the present disclosure is the driving assistance system according to any one of the first to ninth aspects in which the predetermined condition may include a third condition in which the vehicle is traveling on a road narrower than a predetermined value according to map data, and when the third condition is satisfied, the determiner may determine that the predetermined condition is satisfied.

In this way, it is possible to effectively assist the driver in driving the vehicle while the vehicle is traveling on the road narrower than the predetermined value.

For example, a driving assistance system according to an eleventh aspect of the present disclosure is the driving assistance system according to any one of the first to tenth aspects in which the determiner may determine that the predetermined condition is not satisfied when a turn signal lever of the vehicle is returned to an original position, when the vehicle has traveled a predetermined distance or more after turning right or left, or when a road on which the vehicle is traveling is determined to be wider than a predetermined value, and the first controller and the second controller may stop display of the overhead image when a state where the predetermined condition is satisfied transitions to a state where the predetermined condition is not satisfied.

In this way, the overhead image is not displayed when the predetermined condition is not satisfied, and thus it is possible to reduce the amount of processing in the driving assistance system.

For example, a driving assistance system according to a twelfth aspect of the present disclosure is the driving assistance system according to any one of the first to eleventh aspects which may further include an operation interface for switching a function of displaying the overhead image on and off.

In this way, the overhead image is displayed when the driver needs the overhead image, and thus it is possible to more effectively assist the driver in driving the vehicle.

For example, a driving assistance system according to a thirteenth aspect of the present disclosure is the driving assistance system according to any one of the first to twelfth aspects which may further include a second display device that is disposed in front of the driver seat, and when preset setting information that indicates whether the overhead image is to be displayed on the first display device or the second display device specifies the first display device, the second controller may display the second image on the first display device.

In this way, the overhead image is displayed on the display device disposed in a position at which the driver easily gazes, and thus it is possible to more effectively assist the driver in driving the vehicle.

For example, a driving assistance system according to a fourteenth aspect of the present disclosure is the driving assistance system according to any one of the first to thirteenth aspects in which the first display device may be a head-up display or an instrument cluster.

In this way, it is possible to display the overhead image on the head-up display or the instrument cluster which is easily disposed in sight of the driver.

A driving assistance method according to a fifteenth aspect of the present disclosure is a driving assistance method for providing driving assistance to a driver in a vehicle that includes a display device disposed in front of a driver seat and an electronic side mirror, and the driving assistance method includes: determining whether a predetermined condition is satisfied in the vehicle driven by the driver; generating an overhead image including an area around the vehicle when the predetermined condition is satisfied; displaying, on the electronic side mirror, a first image including the overhead image generated; and displaying, on the display device, a second image including the overhead image generated. A recording medium according to a sixteenth aspect of the present disclosure is a non-transitory computer-readable recording medium having recorded thereon a program for causing a computer to execute the driving assistance method described above.

In this way, the same effects as in the driving assistance system described above are achieved.

These general and specific aspects may be implemented using a system, a method, an integrated circuit, a computer program, or a non-transitory recording medium such as a computer-readable CD-ROM, or may be implemented by any combination of a system, a method, an integrated circuit, a computer program and a recording medium. A program may be previously stored in a recording medium or may be supplied to a recording medium via a wide area communication network such as the Internet.

Embodiments will be specifically described below with reference to drawings.

Each of the embodiments described below indicates a general or specific example. Numerical values, shapes, constituent elements, the arrangement and connection of the constituent elements, steps, the order of the steps, and the like shown in the following embodiments are examples, and are not intended to limit the present disclosure. Among the constituent elements in the following embodiments, constituent elements which are not recited in the independent claims are described as optional constituent elements.

The drawings are schematic views, and are not exactly shown. Hence, for example, scales and the like in the drawings are not necessarily the same. In the drawings, substantially the same configurations are identified with the same reference signs, and repeated description is omitted or simplified.

In the present specification, terms such as same which indicate relationships between elements, and numerical values and the ranges of numerical values are expressions which not only indicate exact meanings but also indicate substantially equivalent ranges such as a range including about a several percent difference (or about a 10 percent difference).

In the present specification, unless otherwise specified, ordinal numbers such as "first" and "second" do not mean the number or order of constituent elements but are used to avoid confusion of similar constituent elements and distinguish between the similar constituent elements.

Embodiment

A driving assistance system according to the present embodiment will be described below with reference to FIGS. 1 to 6.

1. Configuration of Driving Assistance System

The configuration of the driving assistance system according to the present embodiment will first be described with reference to FIGS. 1 to 4. FIG. 1 is a block diagram showing the functional configuration of driving assistance system 1 according to the present embodiment. Driving assistance system 1 is an information processing system for assisting a driver in driving, and driving assistance system 1 assists the driver in driving, for example, when a vehicle turns right or left to enter a narrow road. The case where driving assistance system 1 assists the driver is not limited to the case where the vehicle turns right or left, and may be, for example, a case where the vehicle travels straight (for example, a case where the vehicle travels straight on a narrow road) or the like. Driving assistance system 1 also assists the driver in driving the vehicle in a case where the driver travels while checking both left and right sides of the vehicle with the direction of travel of the vehicle being an axis when the vehicle is viewed from overhead. Driving assistance system 1 also assists the driver in driving the vehicle when the vehicle travels forward. Although an example will be described below where an overhead image is displayed for the driver (for example, the overhead image is additionally displayed) to assist the driver, the overhead image is assumed to be displayed when the vehicle traves not backward but forward.

As shown in FIG. 1, driving assistance system 1 includes driving assistance device 10, image processing device 20, camera module 30, first control device 40, second control device 50, and third control device 60. Although constituent elements included in driving assistance system 1 are installed in the vehicle, at least a part of the constituent elements may be realized by a device (for example, a server device) which is outside the vehicle and is connected to be able to communicate with the vehicle.

The vehicle is, for example, an automobile or the like which is driven by the driver. Although not illustrated, the vehicle includes at least one of an operation interface (for example, operation interface 130 shown in FIG. 2) such as a button or a touch panel which receives an operation from the driver, a turn signal (winker) lever, various types of sensors such as a speed sensor and a global positioning system (GPS) sensor related to the travel of the vehicle, a navigation system, a storage which stores map information or the like or the like.

Driving assistance device 10 includes functional information acquirer 11a, input information acquirer 11b, vehicle speed information acquirer 11c, self-position information acquirer 11d, navigation route information acquirer 11e, map information acquirer 11f, display condition determiner 12, signal transmitter 13, image receiver 14, image analyzer 15, image editor 16, destination determiner 17, and image transmitter 18. The functional configuration of driving assistance device 10 is realized, for example, by one electronic control unit (ECU) (first ECU).

Functional information acquirer 11a acquires information related to the display function of displaying the overhead image. Functional information acquirer 11a acquires, for example, function setting information of the driver as to whether the display function is turned on or off. Functional information acquirer 11a may read the function setting information stored in a storage (not shown), may acquire, as the function setting information, detection information obtained by detecting that the driver operates operation interface 130, or may acquire the function setting information by communication from an external device including a communication circuit (communication module).

Input information acquirer 11b acquires information related to an operation performed by the driver in the travel of the vehicle, and acquires, for example, an operation performed by the driver for turning right or left in the travel of the vehicle. For example, when the turn signal lever is operated by the driver, input information acquirer 11b acquires input information indicating whether the operation is performed for turning right or left. For example, when the vehicle travels without using route information in the navigation system, the input information is used so that driving assistance device 10 predicts to which side the vehicle subsequently turns. Input information acquirer 11b may acquire the input information from a sensor which detects an operation performed on the turn signal lever.

Vehicle speed information acquirer 11c acquires vehicle speed information related to the vehicle speed of the vehicle. Vehicle speed information acquirer 11c may acquire the vehicle speed information, for example, from the speed sensor which detects the vehicle speed. The vehicle speed is, for example, a vehicle speed at present.

Self-position information acquirer 11d acquires self-position information related to the current position of the vehicle. Self-position information acquirer 11d may acquire the self-position information of the vehicle, for example, from a sensor (for example, the GPS sensor) which detects the current position of the vehicle.

Self-position information acquirer 11d may further acquire a distance from the current position to a specific position such as an intersection based on the current position, the map information, and the like.

Navigation route information acquirer 11e acquires information related to the travel route of the vehicle set in the navigation system installed in the vehicle. Navigation route information acquirer 11e acquires, for example, information indicating the travel route from the current position to a destination. Navigation route information acquirer 11e can communicate with the navigation system.

Map information acquirer 11f acquires the map information around the vehicle. Map information acquirer 11f may read the map information stored, for example, in the storage or may acquire the map information by communication from an external device including a communication circuit (communication module).

The map information is used, for example, when the vehicle travels without using the route guidance function of the navigation system. The map information includes information related to roads around the vehicle, and is used to acquire, for example, the width of a road which the vehicle turns right or left to enter. The information related to roads includes information indicating the widths of the roads.

Display condition determiner 12 determines whether a predetermined condition is satisfied in the vehicle based on at least one of pieces of information acquired by the acquirers. Display condition determiner 12 determines the start or end of the display of the overhead image according to whether a predetermined start condition or a predetermined end condition is satisfied. Display condition determiner 12 is also said to determine whether a display condition for displaying the overhead image is satisfied. When the predetermined start condition) condition (predetermined is satisfied, display condition determiner 12 determines to start the display of the overhead image, and when the predetermined end condition is satisfied during display of the overhead image, display condition determiner 12 determines to end the display of the overhead image. Display condition determiner 12 is an example of a determiner.

The predetermined start condition is a condition with which it is possible to determine whether the vehicle turns right or left, and may be, for example, that the turn signal lever is input to the left or right side in a state where the travel speed of the vehicle is less than or equal to a certain value, or may be that when the navigation system provides route guidance for turning right or left to enter a narrow road whose width is less than or equal to a predetermined value, the vehicle is in a state where the travel speed is less than or equal to a certain value (for example, 10 km/h or less) in a region immediately before the vehicle turns right or left (for example, a region 10 m in front of a location where the vehicle turns right or left). That the travel speed is less than or equal to the certain value means that the vehicle is slowing down.

The predetermined start condition may be that the vehicle is traveling on a road narrower than a predetermined value according to map data, and for example, when the vehicle is traveling on a road narrower than the predetermined value according to the map data, the predetermined start condition may be that the vehicle enters a specific location of the road in a state where the travel speed is less than or equal to a predetermined speed. The predetermined start condition may be that the vehicle is traveling on a road leading to a narrow road according to the map data, and the vehicle enters a specific location of the road at a travel speed which is less than or equal to a certain travel speed. The map data includes map data on the navigation system, map data which is produced using a sensor in an in-vehicle device, and the like. Examples of the specific location include an intersection, a T-junction, a location where the width of a road is narrower than the predetermined value, and the like.

The predetermined start condition may be that the driver presses a display switch (for example, operation interface 130 which will be described later). For example, two switches are prepared, when one of them is pressed, the overhead image may be displayed on electronic side mirror 120L for showing a rear left area and a display in front of a driver seat, and when the other is pressed, the overhead image may be displayed on electronic side mirror 120R for showing a rear right area and the display in front of the driver seat.

The predetermined start condition may be that the driver continues to press a dedicated switch (for example, operation interface 130 which will be described later). For example, two switches are prepared, when one of them continues to be pressed, the overhead image may be displayed on electronic side mirror 120L for showing the rear left area and the display in front of the driver seat, and when the other continues to be pressed, the overhead image may be displayed on electronic side mirror 120R for showing the rear right area and the display in front of the driver seat.

The predetermined start condition may be that a specific gesture associated with the start of the display is detected. Examples of the gesture may include a wink, pointing and the like performed by the driver. The predetermined start condition may be that the start of the display is indicated by the driver through voice input. The predetermined start condition may be that the start of the display is indicated from infrastructure facilities. Example of the infrastructure facilities include a traffic light, a dedicated device, and the like. For example, the infrastructure facilities are configured to be able to acquire the details of indication of the turn signal of the vehicle and information for determining whether the vehicle turns right or left, such as a lane on which the vehicle is traveling.

Examples of the predetermined start condition include the conditions described above. Examples of the predetermined end condition include the following conditions.

The predetermined end condition may be that the return of the turn signal lever to an original position is detected, that the vehicle has traveled a certain distance or more on a narrow road which the vehicle turns to enter, or that the width of a road on which the vehicle is traveling is determined to be winder than the predetermined value. It can be determined from the position of the vehicle on the map data described previously that the vehicle has traveled a certain distance or more. The predetermined end condition may be that a switch for stopping the display is pressed or that a dedicated switch is pressed. The predetermined end condition may be that a specific gesture associated with the end of the display is detected. Examples of the gesture include a wink, pointing and the like performed by the driver. The predetermined end condition may be that the end of the display is indicated by the driver through voice input. The predetermined end condition may be that the end of the display is indicated from infrastructure facilities.

Signal transmitter 13 transmits signals indicating the start and end of generation of the overhead image to image processing device 20. When display condition determiner 12 determines to start the display of the overhead image, signal transmitter 13 transmits a start signal indicating the start of generation of the overhead image to image processing device 20, and when display condition determiner 12 determines to end the display of the overhead image, signal transmitter 13 transmits an end signal indicating the end of generation of the overhead image to image processing device 20. In this way, during a period until the end signal is received after the reception of the start signal, it is possible to cause image processing device 20 to generate the overhead image.

Image receiver 14 receives the overhead image generated by image processing device 20 from image transmitter 24. Image receiver 14 includes, for example, a communication circuit (communication module).

Image analyzer 15 analyzes the overhead image to detect an object (or a dangerous region) which obstructs the travel of the vehicle and needs to be visually recognized by the driver, and extracts the outline of the object (or the dangerous region). Image analyzer 15 detects, for example, an object such as an obstacle, a ditch, or a curbstone shown in the overhead image, and extracts the outline of the detected object.

Image editor 16 adds (for example, superimposes), to the overhead image, a display which highlights the outline extracted by image analyzer 15. Image editor 16 may add, to the overhead image, lines (see lines L1 and L2 shown in FIG. 4 and described later) which highlight the outline.

When a plurality of displays are disposed on the front side of the driver seat, destination determiner 17 determines, among the displays, one or more displays serving as destinations to which the overhead image is transmitted. For example, when both a head-up display (display 110) and an instrument cluster (for example, display 110a shown in FIG. 7 or display 110b shown in FIG. 8) are installed in the vehicle, destination determiner 17 determines, based on list information previously set by the driver, to transmit the overhead image to one or both of the head-up display and the instrument cluster. Displays 110, 110a, and 110b are examples of a first display device.

Specifically, destination determiner 17 determines, based on the list information of the list of displays for displaying the overhead image, two or more control devices serving as the destinations of the overhead image among a plurality of control devices such as first control device 40, second control device 50, and third control device 60 for controlling the displays. The two or more control devices include one or more control devices (for example, first control device 40) which control electronic side mirrors 120R and 120L and one or more control devices (for example, second control device 50 for controlling display 110) which control displays in sight of the driver when the driver visually recognizes the front.

The list information is previously set by the driver or the like and is stored in the storage. The list information includes information indicating on which display the overhead image is displayed among a plurality of displays installed in the vehicle.

Image transmitter 18 transmits the overhead image edited by image editor 16 to the two or more destinations determined by destination determiner 17. The overhead images transmitted to the two or more destinations are, for example, the same image. Image transmitter 18 includes, for example, a communication circuit (communication module).

Image processing device 20 includes signal receiver 21, image acquirer 22, image processor 23, and image transmitter 24. The functional configuration of image processing device 20 is realized, for example, by one ECU (second ECU). The second ECU is, for example, an ECU which is separate from the first ECU.

Signal receiver 21 receives the start signal and the end signal transmitted from signal transmitter 13. Signal receiver 21 includes, for example, a communication circuit (communication module).

Image acquirer 22 is connected to be able to communicate with camera module 30, and acquires one or more camera images for generating the overhead image from camera module 30. The camera images acquired from camera module 30 are, for example, images which are obtained by capturing an area around the vehicle.

When the vehicle satisfies the predetermined start condition described above, image processor 23 generates, from the images acquired by image acquirer 22, the overhead image which is subjected to viewpoint conversion processing so that the vehicle is viewed down from above in a vertical direction in the overhead image. Image processor 23 is an example of a generator.

Image transmitter 24 transmits the overhead image generated by image processor 23 to driving assistance device 10 (image receiver 14). Image transmitter 24 includes, for example, a communication circuit (communication module).

Camera module 30 can capture images capable of generating the overhead image, and includes one or more cameras capable of capturing an area around the vehicle. Although camera module 30 is installed in the vehicle, the present embodiment is not limited to this configuration, and camera module 30 may be provided, for example, outside the vehicle.

Each of the control devices is a control device which can control a plurality of displays installed in the vehicle. For example, the functional configurations of the control devices are the same, and first control device 40 will be described below as an example. In the following description, the constituent elements of second control device 50 are identified with the reference signs of the constituent elements of first control device 40.

First control device 40 is a control device which controls the display of electronic side mirrors 120R and 120L, and includes image receiver 41, drawer 42, and display controller 43. The functional configuration of first control device 40 is realized, for example, by one ECU (third ECU). The third ECU is an ECU which is separate from the first and second ECUs. First control device 40 is an example of a first controller.

Electronic side mirror 120R is a side mirror which includes a display capable of displaying a rear right image obtained by capturing the rear right area on the vehicle, and electronic side mirror 120L is a side mirror which includes a display capable of displaying a rear left image obtained by capturing the rear left area on the vehicle. In the following description, when electronic side mirrors 120R and 120L are not distinguished or when both of them are included, they are also referred to as electronic side mirror 120.

Image receiver 41 receives the overhead image transmitted from image transmitter 18. Image receiver 41 includes, for example, a communication circuit (communication module).

Drawer 42 generates images which are displayed on electronic side mirrors 120R and 120L. When image receiver 41 receives the overhead image, drawer 42 draws an image including a displayed item other than the overhead image based on display layout information. Drawer 42 generates a display image so that the rear right image and the overhead image are simultaneously displayed on one screen of electronic side mirror 120R, and generates a display image so that the rear left image and the overhead image are simultaneously displayed on one screen of electronic side mirror 120L.

Examples of the generation of the image displayed on electronic side mirror 120R will be described, and drawer 42 may superimpose the overhead image on the rear right image to display the overhead image, may reduce the rear right image to display the overhead image in an empty display space, or may hide the rear right image (for example, the image including the displayed item which is originally displayed) to display only the overhead image. When drawer 42 superimposes the overhead image on the rear right image to display the overhead image, drawer 42 may cause the whole or a part of the overhead image to be translucent to display the overhead image.

The display layout information includes information indicating in which form the overhead image is displayed and information indicating the display position of the overhead image on electronic side mirror 120R. For example, the display layout information is previously set by the driver and is stored in the storage.

Display controller 43 generates control signals for displaying the display images generated by drawer 42 on electronic side mirrors 120R and 120L, and outputs them to electronic side mirrors 120R and 120L. Display controller 43 performs control for displaying the display images on electronic side mirrors 120R and 120L.

Second control device 50 is a control device which controls a display disposed in front of the driver seat, and in the present embodiment, second control device 50 controls the display of display 110 of the head-up display. Second control device 50 is an example of a second controller.

The head-up display is a display device which causes the driver operating the vehicle to visually recognize any information related to the vehicle as an image (for example, visual information including a number, a character, and a figure such as an arrow). For example, the head-up display uses a windshield (front glass) or a combiner installed in front of the cockpit of the vehicle as a display medium, projects an image onto the windshield or the like to reflect the image, and thereby causes the driver to visually recognize the image as a virtual image. Here, since the windshield and the combiner are translucent, light incident from the outside of the vehicle is visually recognized by the driver as scenery seen through the windshield together with the virtual image. Display 110 is realized by a part of the front glass.

Third control device 60 is a control device which controls the display disposed in front of the driver seat, and is, for example, a control device which controls the display of the instrument cluster.

Operation interface 130 is a switch for switching the function of displaying the overhead image on and off, and is, for example, provided in a steering wheel or the like. Operation interface 130 may be, for example, a dedicated button. Each time operation interface 130 is pressed, the function of displaying the overhead image may be switched on and off, or the function of displaying the overhead image may be turned on only during a period in which operation interface 130 is kept pressed.

In the vehicle, instead of or together with operation interface 130, a device (for example, a sound collection device or an imaging device) for switching the function of displaying the overhead image on and off by voice, a gesture, or the like may be provided.

Although the example is described above where the function of displaying the overhead image is switched on and off by operation interface 130, the present embodiment is not limited to this example, and for example, a setting for constantly keeping the function of displaying the overhead image on may be provided. The driver previously makes a setting such that the overhead image is constantly displayed, and thus the driver does not need to operate operation interface 130 when the vehicle turns right or left, with the result that safety when the vehicle turns right or left can be enhanced. The predetermined start condition in this case is that the setting for constantly keeping the function of displaying the overhead image on is made.

Details of driving assistance provided by driving assistance system 1 configured as described above will then be described with reference to FIGS. 2 to 4. FIG. 2 is a diagram for illustrating details of driving assistance provided by driving assistance system 1 according to the present embodiment when vehicle 100 turns left. For example, FIG. 2 shows details of the display of displays when vehicle 100 turns left to enter road 210 narrower than a predetermined value (predetermined width). Parts (a) to (c) in FIG. 2 show image diagrams when vehicle 100 turns left. Part (a) in FIG. 2 is a diagram showing an image which is displayed in the front of vehicle 100, part (b) in FIG. 2 is a diagram showing an image which is displayed on electronic side mirror 120L on the left side of vehicle 100, and part (c) in FIG. 2 is a diagram showing an image which is displayed on electronic side mirror 120R on the right side of vehicle 100.

When in the situation of FIG. 2, the driver looks ahead to the right, the driver can visually recognize wall 220R but easily neglects to pay attention to a wall (wall 220L shown in FIG. 4) on the left side of vehicle 100. Even when the driver looks ahead to the right, if the driver is not accustomed to driving vehicle 100, it may be difficult to perceive a distance from wall 220R.

When in the situation of FIG. 2, the driver looks toward electronic side mirror 120L to check the left side, the driver can visually recognize wall 220L over electronic side mirror 120L but easily neglects to pay attention to wall 220R on the right side.

A similar issue may occur when vehicle 100 turns right. FIG. 3 is a diagram for illustrating details of driving assistance provided by driving assistance system 1 according to the present embodiment when vehicle 100 turns right. For example, FIG. 3 shows details of the display of the displays when vehicle 100 turns right to enter road 210 narrower than the predetermined value. Parts (a) to (c) in FIG. 3 show image diagrams when vehicle 100 turns right. Specifically, part (a) in FIG. 3 is a diagram showing an image which is displayed in the front of vehicle 100, part (b) in FIG. 3 is a diagram showing an image which is displayed on electronic side mirror 120L on the left side of vehicle 100, and part (c) in FIG. 3 is a diagram showing an image which is displayed on electronic side mirror 120R on the right side of vehicle 100.

When in the situation of FIG. 3, the driver looks ahead to the left, the driver can visually recognize building 221L but easily neglects to pay attention to wall 220R on the right side of vehicle 100. Even when the driver looks ahead to the left, if the driver is not accustomed to driving vehicle 100, it may be difficult to perceive a distance from building 221L.

When in the situation of FIG. 3, the driver looks toward electronic side mirror 120R to check the right side, the driver can visually recognize wall 220R over electronic side mirror 120R but easily neglects to pay attention to building 221L on the left side.

As described above, for example, when vehicle 100 turns left and right to enter a narrow road, the first and second issues described above may occur. The first and second issues may occur, for example, when vehicle 100 travels straight on a narrow road.

Hence, as shown in parts (a) to (c) in FIG. 2, driving assistance system 1 displays overhead image P1 of vehicle 100 on each of display 110, electronic side mirror 120R, and electronic side mirror 120L. In this way, driving assistance system 1 can display overhead image P1 in sight of the driver both when the driver gazes ahead of vehicle 100 and when the driver gazes at electronic side mirror 120L to watch for an obstacle on the side. Overhead image P1 is, for example, an image with which the driver can easily perceive a distance between vehicle 100 and a wall, a ditch, or the like, and is an image which allows the driver to perceive the surrounding conditions of vehicle 100. Therefore, the driver can easily check the surrounding conditions of vehicle 100 such as a distance to an obstacle or a ditch while appropriately paying attention to the front and the side of vehicle 100. This leads to suppression of the occurrence of a collision with an obstacle and suppression of a wheel going off of the road.

Overhead image P1 displayed on each of display 110, electronic side mirror 120R, and electronic side mirror 120L is the same image (for example, an image shown in FIG. 4).

Driving assistance system 1 simultaneously displays overhead image P1 of vehicle 100 on electronic side mirrors 120R and 120L and display 110 installed in front of the driver seat. Driving assistance system 1 may change the display position of overhead image P1 according to whether vehicle 100 turns right or left. Drawer 42 changes the display position of overhead image P1 on display 110 according to whether vehicle 100 turns right or left. For example, when the vehicle turns right or left to enter road 210 narrower than the predetermined value, drawer 42 may change the display position of overhead image P1 displayed on display 110 according to whether the vehicle turns right or left.

In this case, the display layout information is set for each of a case where vehicle 100 turns right and a case where vehicle 100 turns left. When vehicle 100 turns left, drawer 42 determines the display position of overhead image P1 based on the display layout information for turning left, and when vehicle 100 turns right, drawer 42 determines the display position of the overhead image based on the display layout information for turning right.

As shown in part (a) in FIG. 2, second control device 50 may display overhead image P1 in a region on the right side of display 110 when vehicle 100 turns left, and for example, second control device 50 may display overhead image P1 on the right edge of display 110. In this way, when vehicle 100 turns left, while the driver is looking toward an obstacle or a ditch ahead of vehicle 100, overhead image P1 is easily to be in sight of the driver. An image which includes overhead image P1 and is displayed on display 110 when vehicle 100 turns left is an example of a second image.

As shown in part (a) in FIG. 3, second control device 50 may display overhead image P2 in a region on the left side of display 110 when vehicle 100 turns right, and for example, second control device 50 may display overhead image P2 on the left edge of display 110. In this way, when vehicle 100 turns right, while the driver is looking toward an obstacle or a ditch ahead of vehicle 100, overhead image P2 is easily to be in sight of the driver. An image which includes overhead image P2 and is displayed on display 110 when vehicle 100 turns right is an example of the second image.

For example, when the predetermined start condition is satisfied, second control information for displaying the second image including overhead image P1 generated is output from display controller 43 or second control device 50 to display 110, and thus the second image as described above is displayed.

Driving assistance system 1 displays the overhead image on electronic side mirrors 120R and 120L so as not to prevent the driver from checking a rear view. Drawer 42 may display, for example, based on the display layout information, the overhead image in the display region of each of electronic side mirrors 120R and 120L, on a side of the display region that is closer to a vehicle body. The side of the display region that is closer to the vehicle body may be a region on the side of the vehicle body (inner side) in a half of the display region or may be a region on the side of the vehicle body (inner side) in one third of the display region when electronic side mirror 120R or 120L is viewed from the front.

For example, as shown in parts (b) and (c) in FIG. 2 and parts (b) and (c) in FIG. 3, drawer 42 may display the overhead image in a region on the side of the vehicle body in the half of the display region and in an upper portion of the display region (for example, an upper corner). The display in the region in the upper portion of the display region means that a half or more of the area of the overhead image is displayed in a region in an upper portion of regions in the upper and lower portions of the display region. An image which includes overhead image P1 and is displayed on each of electronic side mirrors 120R and 120L is an example of a first image.

For example, when the predetermined start condition is satisfied, first control information for displaying the first image including overhead image P1 generated is output from display controller 43 of first control device 40 to electronic side mirrors 120R and 120L, and thus the first image as described above is displayed.

Here, overhead image P1 will be described with reference to FIG. 4. FIG. 4 is a diagram showing overhead image P1 of vehicle 100 when vehicle 100 turns left. Overhead image P1 is displayed, and thus for example, even a low obstacle, a low ditch, and the like can be checked using the image.

Image editor 16 may detect the outline of an obstacle or a ditch in overhead image P1, and highlight the outline in color. Image editor 16 may change the color in a gradation manner according to a distance between the obstacle or the ditch and vehicle 100, and for example, as vehicle 100 is closer to the obstacle or the ditch, the outline may be displayed in darker red, and as vehicle 100 is farther from the obstacle or the ditch, the outline may be displayed in lighter red. For example, image editor 16 may display, in dark red, an area where there is an increased risk of causing a collision with the obstacle (or the ditch) or causing a wheel of vehicle 100 to go off the road, and may change the color to lighter red as vehicle 100 travels away from the highly risky area. The ditch is an example of an area which may cause the wheel of vehicle 100 to go off the road. Image editor 16 functions as a part of the generator.

In FIG. 4 line L1 indicates the outline of wall 220R, and as the distance between vehicle 100 and line L1 is shorter, the color of line L1 is darker. Line 2 indicates the outline of wall 220L, and as the distance between vehicle 100 and line L2 is shorter, the color of line L2 is darker.

2. Operation of Driving Assistance System

Figure 5:
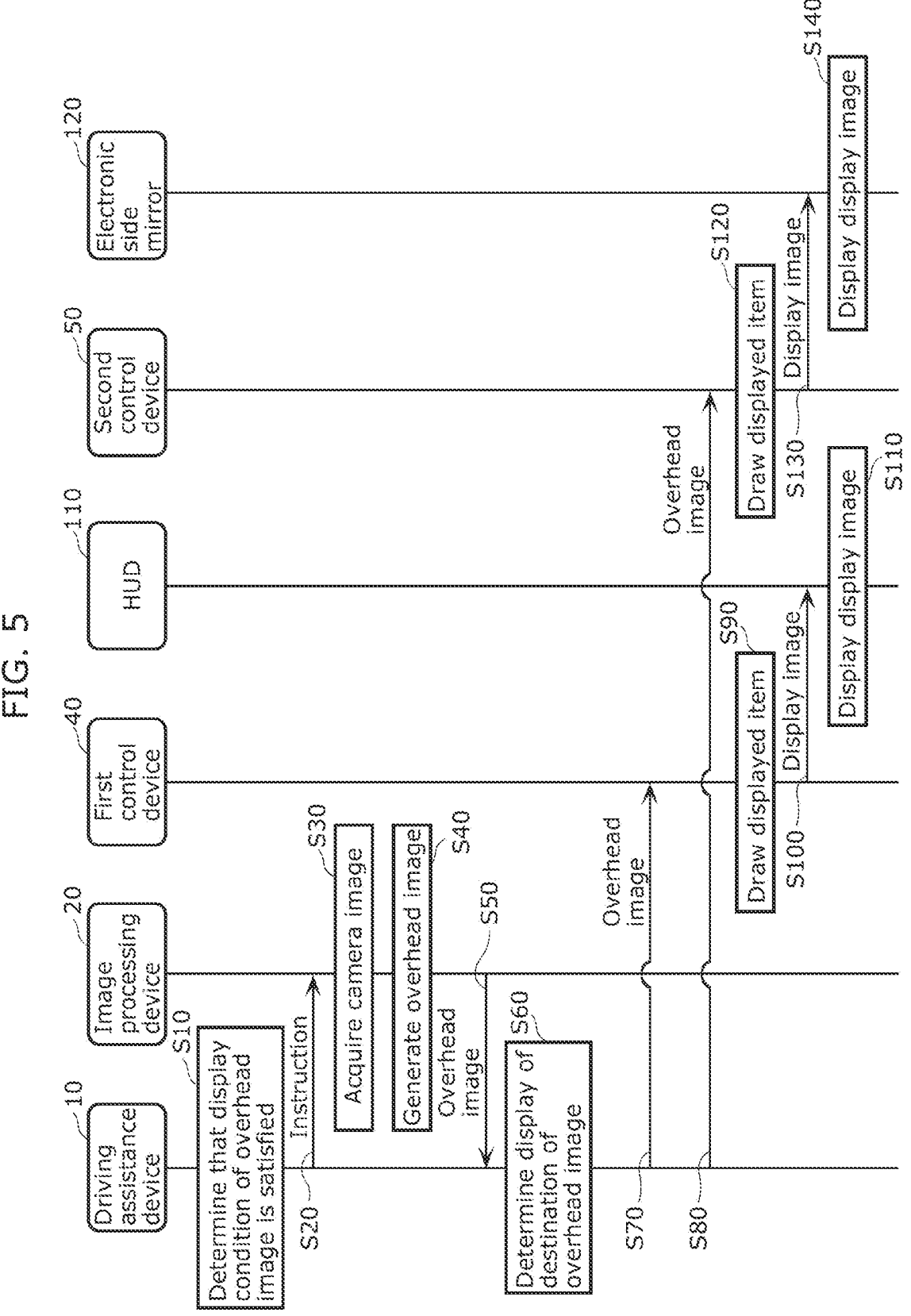
FIG. 5 is a sequence diagram showing an operation of the driving assistance system according to the embodiment.

An operation of driving assistance system 1 configured as described above will then be described with reference to FIGS. 5 and 6. FIG. 5 is a sequence diagram showing the operation (driving assistance method) of driving assistance system 1 according to the present embodiment.

As shown in FIG. 5, when driving assistance device 10 determines that the display condition (for example, the predetermined start condition) of the overhead image is satisfied (S10), driving assistance device 10 transmits an instruction for generating the overhead image to image processing device 20 via signal transmitter 13, and image processing device 20 receives the instruction via signal receiver 21 (S20).

Then, image acquirer 22 of image processing device 20 acquires a camera image for generating the overhead image from camera module 30 (S30). Image acquirer 22 acquires the camera image which is captured at and after the time when the display condition of the overhead image is satisfied. The camera image can include an obstacle around the vehicle, a ditch, and the like. Image acquirer 22 acquires camera images, for example, at predetermined time intervals.

Then, image processor 23 of image processing device 20 generates, based on the camera image acquired by image acquirer 22, the overhead image around vehicle 100 including vehicle 100 (S40). Image processor 23 generates overhead images, for example, at predetermined time intervals.

Then, image processing device 20 transmits the generated overhead image to driving assistance device 10 via image transmitter 24, and driving assistance device 10 receives the overhead image transmitted from image processing device 20 via image receiver 14 (S50). Driving assistance device 10 may analyze and edit the overhead image.

Then, destination determiner 17 of driving assistance device 10 determines, based on information previously set by the driver, the display of the destination of the overhead image (S60). For example, destination determiner 17 reads the information from the storage or the like, and determines that the display indicated by the read information is the display of the destination of the overhead image. The example in FIG. 5 shows the sequence diagram when display 110 of the head-up display (HUD) is determined to be the display of the destination of the overhead image. The overhead image is transmitted to electronic side mirror 120 without fail.

Processing in step S60 is performed when a plurality of displays are disposed in front of the driver seat of vehicle 100.

Then, image transmitter 18 of driving assistance device 10 transmits the overhead image to each of the displays of the destinations which are determined (S70 and S80). For example, image transmitter 18 transmits the same overhead image to each of the displays of the destinations which are determined. In this way, the same overhead image can be displayed on each of display 110 and electronic side mirror 120.

Then, when image receiver 41 receives the overhead image (S70), drawer 42 of first control device 40 draws a displayed item (S90). Drawer 42 may generate a display image to be displayed on display 110, for example, by superimposing the overhead image on the displayed item (third image) to be originally displayed on display 110. Drawer 42 may cause the overhead image to be translucent (for example, a transmittance of 50%) to superimpose the overhead image on the displayed item. Drawer 42 may stop the display of the third image to be displayed on display 110 to display only the overhead image. Drawer 42 may change the display layout of the third image to be displayed on display 110 to simultaneously display the third image whose display layout has been changed and the overhead image. An image for simultaneously displaying the third image and the overhead image is an example of the second image.

The third image is an image which is not the overhead image, and is displayed regardless of whether the predetermined start condition is satisfied. The third image may be an image for assisting the driver in the travel of the vehicle, and may be, for example, an image which indicates route guidance, the condition of the vehicle, or the like.

Whether the overhead image is superimposed on the displayed item, whether the display layout of the third image is changed and the like may be previously set by the driver. In this case, drawer 42 may read information previously set by the driver, and may determine, based on the read information, whether the overhead image is superimposed on the displayed item, whether the display layout of the third image is changed and the like Then, display controller 43 outputs control information for displaying the display image generated by drawer 42 to display 110, and display 110 acquires the control information (S100). Then, display 110 displays the display image based on the control information acquired from display controller 43 (S110).

When image receiver 41 receives the overhead image (S80), drawer 42 of second control device 50 draws the displayed item (S120). Drawer 42 of second control device 50 may generate the display image to be displayed on electronic side mirror 120, for example, by superimposing the overhead image on the displayed item (image) to be originally displayed on electronic side mirror 120. Drawer 42 of second control device 50 may cause the overhead image to be translucent (for example, a transmittance of 50%) to superimpose the overhead image on the displayed item. Drawer 42 of second control device 50 may display the overhead image by another method which is performed by drawer 42 of first control device 40.

Then, display controller 43 of second control device 50 outputs control information for displaying the display image generated by drawer 42 to electronic side mirror 120, and electronic side mirror 120 acquires the control information (S130).

Then, electronic side mirror 120 displays the display image based on the control information acquired from display controller 43 of second control device 50 (S140). In step S140, each of electronic side mirrors 120R and 120L may display the display image including the overhead image, and only one electronic side mirror 120 corresponding to the direction of travel of vehicle 100 may display the display image including the overhead image.

Processing in step S70 and steps S90 to S110 is performed parallel with processing in step S80 and steps S120 to S140. For example, step S110 and step S140 are simultaneously performed. For example, a period during which the overhead image is displayed in the display image of display 110 overlaps at least a part of a period during which the overhead image is displayed on electronic side mirror 120. In this way, even when the driver checks the front side or even when the driver checks the side, it is possible to cause the driver to visually recognize the overhead image.

The operation of driving assistance device 10 will then be described with reference to FIG. 6. FIG. 6 is a flowchart showing the operation (driving assistance method) of driving assistance device 10 according to the present embodiment.

Figure 6:
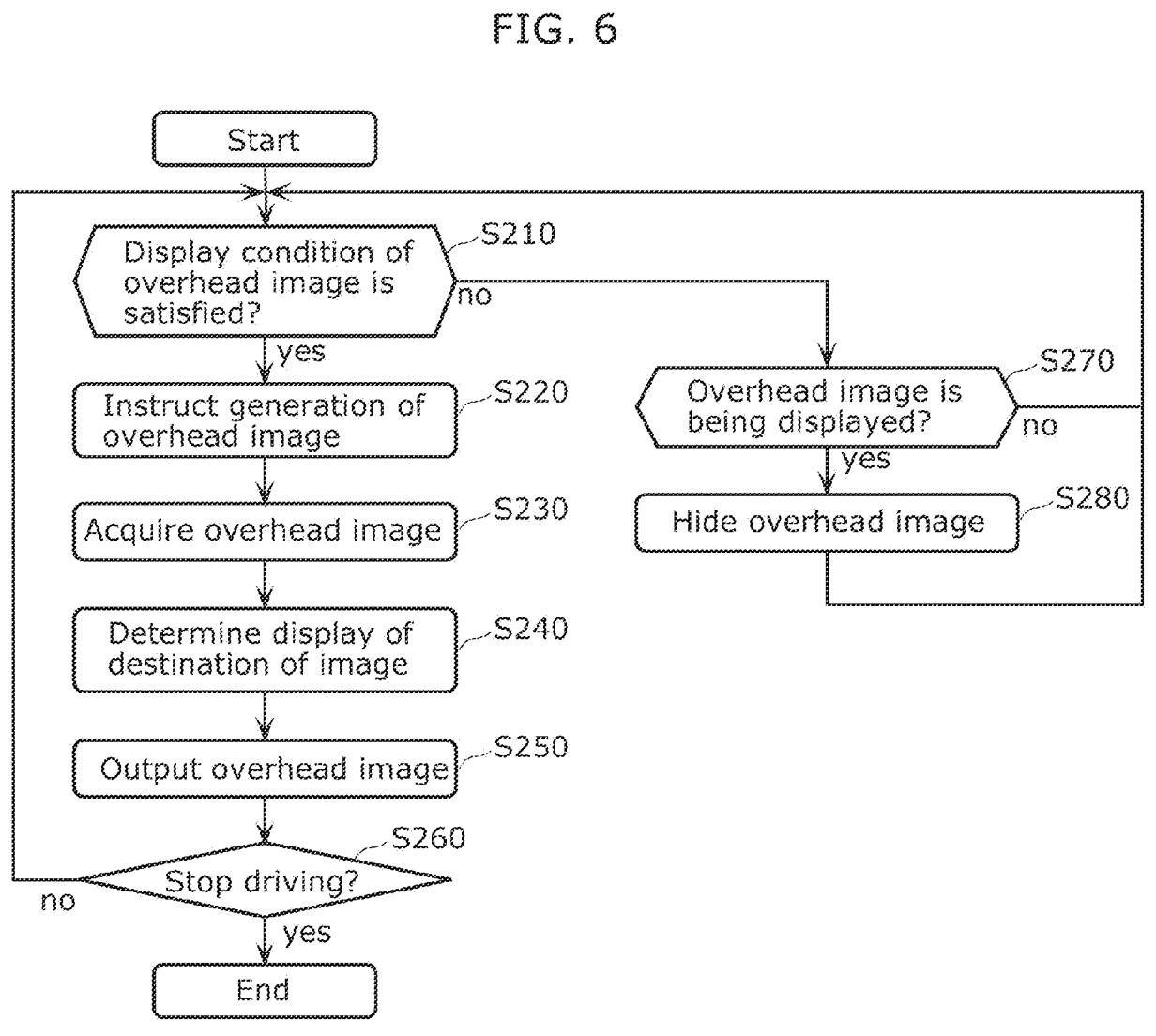

As shown in FIG. 6, display condition determiner 12 of driving assistance device 10 determines, based on information acquired by the acquirers, whether vehicle 100 satisfies the display condition of the overhead image at preset (S210). When any of the conditions described previously is satisfied, display condition determiner 12 determines that the display condition of the overhead image is satisfied. The display condition of the overhead image is an example of the predetermined condition (predetermined start condition). A determination of yes in step S210 corresponds to step S10 shown in FIG. 5.

Then, when display condition determiner 12 determines that the condition of vehicle 100 satisfies the display condition of the overhead image (yes in S210), signal transmitter 13 of driving assistance device 10 transmits an instruction for generating the overhead image to image processing device 20 (S220). Step S220 corresponds to step S20 shown in FIG. 5. In this way, the overhead image is generated by image processing device 20.

Then, image receiver 14 of driving assistance device 10 acquires the overhead image from image processing device 20 (S230). Step S230 corresponds to step S50 shown in FIG. 5.

Then, destination determiner 17 of driving assistance device 10 determines the display of the destination of the image based on information previously set by the driver (S240). Step S240 corresponds to step S60 shown in FIG. 5.

Then, image transmitter 18 of driving assistance device 10 outputs the overhead image to each of first control device 40 and second control device 50 (S250). Step S250 corresponds to steps S70 and S80 shown in FIG. 5.

Then, driving assistance device 10 determines whether the driving is stopped (S260). For example, when the vehicle reaches a destination or when an operation for stopping the driving is received from the driver, driving assistance device 10 may determine that the driving is stopped. When driving assistance device 10 determines that the driving is stopped (yes in S260), driving assistance device 10 ends the processing for displaying the overhead image, and when driving assistance device 10 determines that the driving is not stopped (no in S260), driving assistance device 10 returns to step S210 to continue the processing.

When display condition determiner 12 of driving assistance device 10 determines that the condition of vehicle 100 does not satisfies the display condition of the overhead image (no in S210), display condition determiner 12 further determines whether the overhead image is being displayed at present (S270). Display condition determiner 12 may make the determination in step S270 based on the result of the determination in step S210 immediately before a determination of no in step S210 is made.

When display condition determiner 12 determines that the overhead image is being displayed at present (yes in S270), driving assistance device 10 performs processing for hiding the overhead image (S280). For example, signal transmitter 13 of driving assistance device 10 transmits a signal indicating the end of the generation of the overhead image to image processing device 20. When image processor 23 acquires the signal via signal receiver 21, image processor 23 stops the processing for generating the overhead image.

When display condition determiner 12 determines that the overhead image is not being displayed at present (no in S270), driving assistance device 10 returns to step S210 to continue the processing.

Variation 1 of Embodiment

Another example of a vehicle to which assistance is provided by the driving assistance system will be described below with reference to FIGS. 7 and 8. Differences from the embodiment will be mainly described below, and description of the same or similar details as in the embodiment is omitted or simplified.

FIG. 7 is a diagram showing an example of an internal configuration of the vehicle according to the present variation. In FIG. 7, an example where an instrument cluster disposed in front of the driver seat is display 110a will be described.

As shown in FIG. 7, in the vehicle, display 110a (in the example of FIG. 7, a multi-information display) is installed in the vicinity of devices such as a meter. For example, second control device 50 controls an image displayed on display 110a. When the display condition of the overhead image is satisfied, second control device 50 displays the second image including the overhead image of the vehicle on display 110a.

The multi-information display refers to a display system which is included in an instrument panel.

When both the head-up display and the instrument cluster are installed in the vehicle, a configuration may be adopted where the driver can set on which of the instrument cluster and the head-up display the overhead image is displayed. Second control device 50 may read the setting to display the image including the overhead image on the display indicated by the read setting.

Figure 8:
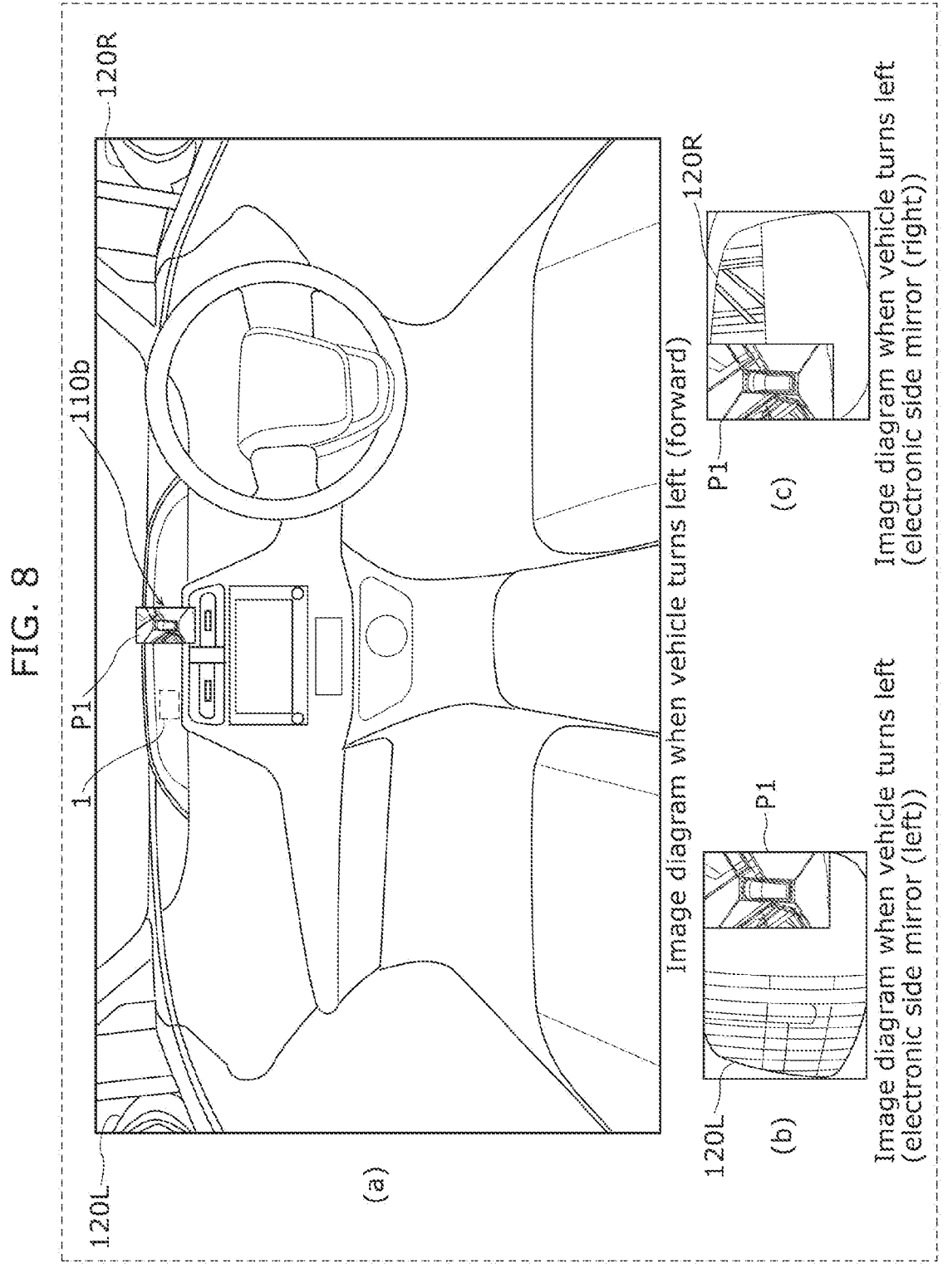
FIG. 8 is a diagram showing another example of the internal configuration of the vehicle according to Variation 1 of the embodiment.

FIG. 8 is a diagram showing another example of the internal configuration of the vehicle according to the present variation.

As shown in FIG. 8, display 110b may be disposed near the center of the instrument panel in a lateral direction. Second control device 50 may display the image including the overhead image on display 110b which is disposed near the center of the instrument panel in the lateral direction.

Variation 2 of Embodiment

A driving assistance system according to the present variation will be described below with reference to FIG. 9. Differences from the embodiment will be mainly described below, and description of the same or similar details as in the embodiment is omitted or simplified.

FIG. 9 is a block diagram showing the functional configuration of driving assistance system 1a according to the present variation.

As shown in FIG. 9, driving assistance system 1a according to the present variation includes driving assistance device 10a, camera module 30, first control device 40, second control device 50, and third control device 60. Driving assistance system 1a includes driving assistance device 10a instead of driving assistance device 10 and image processing device 20 included in driving assistance system 1 according to the embodiment.

Driving assistance device 10a includes both the functions of driving assistance device 10 and image processing device

20. Specifically, driving assistance device 10a includes functional information acquirer 11a, input information acquirer 11b, vehicle speed information acquirer 11c, self-position information acquirer 11d, navigation route information acquirer 11e, map information acquirer 11f, display condition determiner 12, signal transmitter 13, image receiver 14, image analyzer 15, image editor 16, destination determiner 17, image transmitter 18, image acquirer 22a, and image processor 23a. Image acquirer 22a has the same function as image acquirer 22, and image processor 23a has the same function as image processor 23. The functional configuration of driving assistance device 10a is realized, for example, by one ECU.

The one ECU described above may be configured to be able to further realize the functions of the control devices. For example, the one ECU may be configured to be able to further realize the functions of at least one (for example, all) of first control device 40, second control device 50, or third control device 60.

Other Embodiments

Although the driving assistance systems according to one or a plurality of aspects and the like have been described above based on the embodiment and the like, the present disclosure is not limited to the embodiment and the like. Embodiments obtained by performing various variations conceived by those skilled in the art on the present embodiment and embodiments formed by combining constituent elements of different embodiments may be included in the present disclosure as long as they do not depart from the spirit of the present disclosure.

For example, although in the embodiment described above and the like, the example is described where the overhead image is displayed on each of electronic side mirrors 120R and 120L both when the vehicle turns right and when the vehicle turns left, the present disclosure is not limited to this example. The overhead image may be displayed on only electronic side mirror 120R or 120L of electronic side mirrors 120R and 120L corresponding to the direction in which the vehicle turns. For example, when vehicle 100 turns left, the overhead image may be displayed on only electronic side mirror 120L of electronic side mirrors 120R and 120L, and when vehicle 100 turns right, the overhead image may be displayed on only electronic side mirror 120R of electronic side mirrors 120R and 120L.

As a method for generating the overhead image from the surrounding images of vehicle 100 in the embodiment described above and the like, any known method may be used.

Although in the embodiment described above and the like, the example is described where display 110 or the like is provided as the display disposed in front of the driver seat, the present disclosure is not limited to this example, and for example, a display such as a smartphone which is fixed to the front of the driver seat may be used as the display disposed in front of the driver seat.

Although in the embodiment described above and the like, the example is described where drawer 42 determines the display position of the overhead image based on the display layout information, the display position of the overhead image may be determined based on the line of sight of the driver detected based on an image obtained by capturing the driver or the like. For example, drawer 42 may display the overhead image in a region which includes a point where the direction of the line of sight of the driver intersects display 110.

<br/>

In recent years, in order to provide advanced functions such as automatic driving to users, there has been a trend to integrate functions conventionally installed in a plurality of ECUs into a single ECU. In the integration of ECUs, virtualization technology is utilized to operate a plurality of virtual computers on one ECU. The virtual computer is called a virtual machine, and software serving as a virtualization infrastructure which operates a plurality of virtual machines is called a hypervisor. In the present disclosure, a plurality of virtual machines include a virtual machine which serves as an operating system for operating a driving assistance application capable of executing the functions performed by driving assistance devices 10 and 10a, a virtual machine which serves as an operating system for operating an image processing application capable of executing the functions performed by image processing device 20, a virtual machine which serves as an operating system for operating a control application capable of executing the functions performed by various types of control devices and the like. The output and transmission of information in the present disclosure include passing information from one application operating on a hypervisor to another application (for example, passing information inside one chip).

In the embodiment described above and the like, the constituent elements may be formed by dedicated hardware or may be realized by executing a software program suitable for each of the constituent elements. A program executer such as a CPU or a processor may read and execute software programs recorded in a recording medium such as a hard disk or a semiconductor memory so as to realize the constituent elements.

The order of steps performed in the flowchart is provided for specifically illustrating the present disclosure, and an order other than the order described above may be adopted. A part of the steps described above may be performed simultaneously with (parallel with) another step, and a part of the steps described above do not need to be performed.

The division of functional blocks in the block diagram is an example, and a plurality of functional blocks may be realized as one functional block, one functional block may be divided into a plurality of functional blocks, or some functions may be transferred to another function block. The functions of a plurality of functional blocks which have similar functions may be processed by a single piece of hardware or software in parallel or in a time-shared manner.

Each of information processing devices such as the driving assistance devices, the image processing devices, and various types of control devices according to the embodiment described above and the like may be realized as a single device or may be realized by a plurality of devices. When the information processing device is realized by a plurality of devices, how constituent elements included in the information processing device are distributed to the devices is not limited. When the information processing device is realized by a plurality of devices, a communication method between the devices is not particularly limited, and wireless communication or wired communication may be used. Between the devices, wireless communication and wired communication may be combined.

The constituent elements described in the above embodiment and the like may be realized as software or may be typically realized as an LSI circuit which is an integrated circuit. These constituent elements may be individually integrated into one chip, or integration into one chip may be achieved to include a part or all of the constituent elements. Although here, the integrated circuit is an LSI circuit, the integrated circuit may be called an IC, a system LSI circuit, a super LSI circuit, or an ultra LSI circuit depending on the degree of integration. A method for forming the integrated circuit is not limited to LSI, and may be realized by a dedicated circuit (general-purpose circuit which executes a dedicated program) or a general-purpose processor. A field programmable gate array (FPGA) which can be programmed after the manufacturing of an LSI circuit or a reconfigurable processor which can reconfigure connections or settings of circuit cells inside an LSI circuit may be utilized. Furthermore, if an integrated circuit technology which replaces LSI emerges due to an advance in semiconductor technology or another derivative technology, the constituent elements may naturally be integrated using the technology.

The system LSI circuit is a super-multifunctional LSI circuit which is manufactured by integrating a plurality of processors on one chip, and is specifically a computer system which includes a microprocessor, a read only memory (ROM), a random access memory (RAM), and the like. In the ROM, computer programs are stored. The microprocessor is operated according to the computer programs, and thus the system LSI circuit achieves its functions.

One aspect of the present disclosure may be a computer program which causes a computer to execute the characteristic steps included in the driving assistance method shown in either of FIGS. 5 and 6.

For example, the program may be a program which is executed by a computer. One aspect of the present disclosure may be a non-transitory computer-readable recording medium in which such a program is recorded. For example, such a program may be recorded in a recording medium to be distributed or circulated. For example, the distributed program is installed in a device having another processor, the program is executed by the processor, and thus the device can perform the processing described previously.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2023-052143 filed on Mar. 28, 2023.

Industrial Applicability

The present disclosure is useful for an assistance system which assists a driver in driving a vehicle and the like.

The invention claimed is:

1. A driving assistance system that provides driving assistance to a driver in a vehicle, the vehicle including a first display device disposed in front of a driver seat and an electronic side mirror, the driving assistance system comprising:

at least one processor; and at least one memory including at least one program that, when executed by the processor, causes the processor to execute operations, the operations including:

determining whether a predetermined condition is satisfied in the vehicle driven by the driver;

generating an overhead image including an area around the vehicle when the predetermined condition is satisfied;

displaying, on the electronic side mirror, a first image including the overhead image generated in the generating; and displaying, on the first display device, a second image including the overhead image generated in the generating, wherein the processor determines that the predetermined condition is not satisfied when a turn signal lever of the vehicle is returned to an original position, when the vehicle has traveled a predetermined distance or more after turning right or left, or when a road on which the vehicle is traveling is determined to be wider than a predetermined value, and the processor stops display of the overhead image on the electronic side mirror and on the first display device when a first state where the predetermined condition is satisfied transitions to a second state where the predetermined condition is not satisfied.

2. The driving assistance system according to claim 1, wherein when the vehicle turns right or left to enter a road narrower than a predetermined value, the processor changes a display position of the overhead image displayed on the first display device according to whether the vehicle turns right or left.

3. The driving assistance system according to claim 2, wherein when the vehicle turns right, the processor displays the overhead image in a region on a left side of the first display device, and when the vehicle turns left, the processor displays the overhead image in a region on a right side of the first display device.

4. The driving assistance system according to claim 1, wherein the second image includes a third image and the overhead image displayed on the first display device.

5. The driving assistance system according to claim 1, wherein the second image includes only the overhead image.

6. The driving assistance system according to claim 1, wherein the processor displays the overhead image in a display region of the electronic side mirror, on a side of the display region that is closer to a vehicle body.

7. The driving assistance system according to claim 1, wherein the processor generates the overhead image in which an obstacle around the vehicle or an area that may cause a wheel of the vehicle to go off a road is highlighted.

8. The driving assistance system according to claim 1, wherein the predetermined condition includes a first condition in which a speed of the vehicle is less than or equal to a predetermined speed, and a turn signal lever included in the vehicle is being operated, and when the first condition is satisfied, the processor determines that the predetermined condition is satisfied.

9. The driving assistance system according to claim 1, wherein the predetermined condition includes a second condition in which, when the vehicle turns right or left to enter a road narrower than a predetermined value according to an instruction from a navigation system of the vehicle, a speed of the vehicle is less than or equal to a predetermined speed in an area where the vehicle turns right or left, and when the second condition is satisfied, the processor determines that the predetermined condition is satisfied.

10. The driving assistance system according to claim 1, wherein the predetermined condition includes a third condition in which the vehicle is traveling on a road narrower than a predetermined value according to map data, and when the third condition is satisfied, the processor determines that the predetermined condition is satisfied.

11. The driving assistance system according to claim 1, further comprising:

an operation interface for switching a function of displaying the overhead image on and off.

12. The driving assistance system according to claim 1, wherein the vehicle includes a second display device that is disposed in front of the driver seat, and when preset setting information that indicates whether the overhead image is to be displayed on the first display device or the second display device specifies the first display device, the processor displays the second image on the first display device.

13. The driving assistance system according to claim 1, wherein the first display device is a head-up display or an instrument cluster.

14. A driving assistance method for providing driving assistance to a driver in a vehicle, the vehicle including a display device disposed in front of a driver seat and an electronic side mirror, the driving assistance method comprising:

determining, by at least one processor, whether a predetermined condition is satisfied in the vehicle driven by the driver;

generating an overhead image including an area around the vehicle when the predetermined condition is satisfied;

displaying, on the electronic side mirror, a first image including the overhead image generated in the generating; and displaying, on the display device, a second image including the overhead image generated in the generating, wherein the processor determines that the predetermined condition is not satisfied when a turn signal lever of the vehicle is returned to an original position, when the vehicle has traveled a predetermined distance or more after turning right or left, or when a road on which the vehicle is traveling is determined to be wider than a predetermined value, and the displaying of the overhead image on the electronic side mirror and the displaying of the overhead image on the display device are stopped when a first state where the predetermined condition is satisfied transitions to a second state where the predetermined condition is not satisfied.

15. A non-transitory computer-readable recording medium having recorded thereon a program for causing a computer to execute the driving assistance method according to claim 14.

16. A driving assistance system that provides driving assistance to a driver in a vehicle, the vehicle including a first display device disposed in front of a driver seat and an electronic side mirror, the driving assistance system comprising:

at least one processor;

at least one memory including at least one program that, when executed by the processor, causes the processor to execute operations, the operations including:

determining whether a predetermined condition is satisfied in the vehicle driven by the driver; and generating an overhead image including an area around the vehicle when the predetermined condition is satisfied;

a first controller that displays, on the electronic side mirror, a first image including the overhead image generated by the processor; and a second controller that displays, on the first display device, a second image including the overhead image generated by the processor, wherein the processor determines that the predetermined condition is not satisfied when a turn signal lever of the vehicle is returned to an original position, when the vehicle has traveled a predetermined distance or more after turning right or left, or when a road on which the vehicle is traveling is determined to be wider than a predetermined value, and the first controller and the second controller stop display of the overhead image when a first state where the predetermined condition is satisfied transitions to a second state where the predetermined condition is not satisfied.

* * * * *